Oct. 8, 1968     P. N. HILLIARD     3,404,803
PLASTIC RETRACTABLE HANDLE
Filed June 21, 1967

INVENTOR.
PHILIP N. HILLIARD
BY Irwin V. Gleim and
Edward M. Spitle
ATTORNEYS

United States Patent Office 3,404,803
Patented Oct. 8, 1968

3,404,803
PLASTIC RETRACTABLE HANDLE
Phillip N. Hilliard, Bethel, Ohio, assignor to Buckeye Molding Company, New Vienna, Ohio, a corporation of Ohio
Filed June 21, 1967, Ser. No. 647,795
3 Claims. (Cl. 220—94)

ABSTRACT OF THE DISCLOSURE

A plastic closure for sealing and carrying a container and its contents. The closure includes a resilient plastic carrying handle that moves to a carrying position when grasped and automatically retracts to a position substantially flush with the closure surface when released.

Field of invention

This invention relates to packaging and more particularly to an improved closure adapted to be sealed to a container and its contents and provided with means whereby a sealed closure-container and contents package may be lifted and carried when sealed together.

Prior art

The prior use of flexible and other types of closures for hermetically or otherwise sealing a product within a container is exemplified by prior application Ser No. 404,720 filed Oct. 19, 1964, now U.S. Patent 3,257,022. Similarly, a plastic closure provided with handle or lifting means is broadly disclosed in Schlotz Patent 3,156,374. However, the prior art of which applicant is aware contains no disclosure nor suggestion regarding a closure having lifting or carrying means suitable for lifting and/or carrying a container and its contents when the closure has been affixed thereto.

Summary and objects

In packaging of food as well as other merchandise, it is desirable to provide closure means that can be easily and economically produced in desired quantities and which are useful and effective to enclose various types of contents within various types of containers. In certain instances, it is desirable that the container-closure combination be sealed to prevent leakage when the seal is subjected to a high pressure differential so as to be useful to provide a gas or vapor barrier when vacuum packaging, filling and sealing methods are employed. In other instances, the hermetic seal that is capable of providing air tightness or vapor tightness at relatively low pressure differentials is sufficient. In still other instances, it may be sufficient that the seal merely provide sufficient connection between the container and the closure so that the closure function essentially as a cover affixed to the container to avoid spillage of the contents or to avoid contamination of the contents by foreign material.

Closure members in accordance with the present invention preferably employ structures of molded plastic material or a combination of such material with other material in order to provide a tough durable structure having sufficient resilience or elasticity as well as dimensional stability and which is capable of being sealed to a container by various known sealing methods, including heat sealing or welding or by methods involving the use of a sealing compound of a known type such as plastisols, or organosols, sealants of the heat or pressure sensitive type, or by use of a suitable solvent. Although the invention is not necessarily limited thereto, such plastic material may include, for example, polymeric materials such as polyethylene, polystyrene, polyvinyl chloride, and the like. The closure devices and containers sealed thereto may have various shapes and configurations in accordance with the invention such as, for example, circular, oval, polygonal, etc.

Additionally, because of physical size, bulk or weight of such sealed closure-container-content package, it is desirable to provide as part of such package, means for lifting and/or carrying the package. It is further desirable to provide such lifting and/or carrying means as a part of the closure structure. It is equally desirable to provide such lifting and/or carrying means of adequate strength and durability and which are yieldable so that it is readily and easily graspable to facilitate lifting and/or carrying of a sealed closure-container-content package and is also automatically retractable when released to minimize space requirements of such a package and to permit a plurality of such packages to be stacked vertically for display, storage and/or packing purposes without interference.

Accordingly, it is an object of the invention to provide an improved device of the character described which can be manufactured economically and which includes such desirable structural and functional features and yet is of simple and durable construction.

Description

These and other objects of the invention will become apparent from the following description taken in connection with the accompanying drawings wherein.

Figures 1, 2, 3:
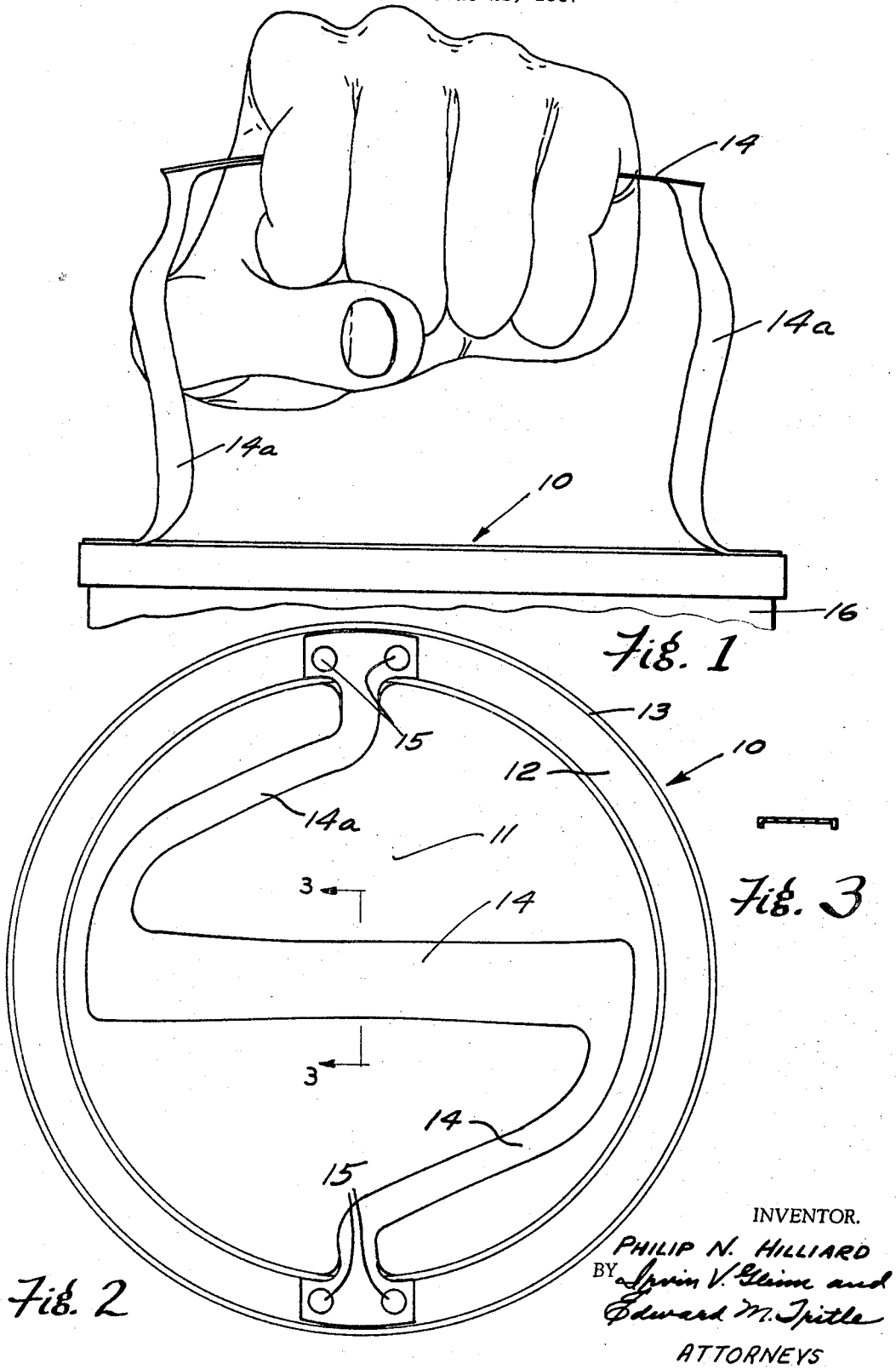
FIGURE 1 is an elevational view of a closure embodying the invention and showing the handle portion thereof in the lifting and/or carrying position.
FIGURE 2 is a plan view of the closure of FIGURE 1.
FIGURE 3 is a sectional view looking in the direction of arrows 3—3 of FIGURE 2.

The following description is intended to be illustrative only, and not limiting, since various changes and modifications can be made without departing from the invention.

Referring to the drawings, a closure of the type described above having dimensions and configurations suitable to sealingly engage and enclose a container and its content is indicated generally at 10. In general, closure 10 comprises a central portion 11, a shoulder portion 12, a rim portion 13, and a yieldable handle 14 connected to some portion of the closure 10 or molded integrally therewith.

As shown in the drawings, handle 14 is a one-piece strap-like member having leg portions 14a and having the general shape of a letter S as is shown in FIGURE 2. The end portions of the legs 14a are connected to the shoulder portion 12 of closure 10 by suitable connecting means 15 which conveniently may be the rivet-like structure disclosed in the co-pending application of William H. Robinson (Docket 1515)z and assigned to the assignee of this application. Alternatively, the ends 14a of handle 14 may be connected to closure 10 by heat sealing, or, if desired, the closure 10 and handle 14 may be molded together to form a one-piece handle-closure unit.

When it is desired to lift and/or carry closure 10 after it has been sealed or otherwise connected to a container (not shown), the fingers of a hand may be inserted between handle 14 and central portion 11 thus enabling the handle 14 to be lifted to the position as shown in FIGURE 1, the leg portions 14a providing sufficient flexibility to allow such yielding and at the same time providing sufficient strength to carry the closure, a container and its contents. Upon release of the handle 14, the resiliency of the handle material will automatically return the handle to its initial position parallel to and adjacent the central portion 11 as best shown in FIGURE 2.

While a particular embodiment of the invention has been illustrated and described, it will be obvious to those skilled in the art that various changes and modifications may be made without departing from the invention and it is intended in the appended claims to cover all such changes and modifications that fall within the true spirit and scope of the invention.

What is claimed is:

1. A plastic closure for sealing a container and having an upper surface, a handle having substantial longitudinal extent and normally disposed in a first postiion substantially flush with said surface, leg portions each connected at opposite ends and at opposite sides of said handle and each having a terminal portion connected to said handle by an intermediate portion, said terminal portion being disposed substantially transversely of said longitudinal extent and disposed between said opposite ends of said handle, said terminal portions being connected to the outer top portions of the closure, said leg portions being resiliently deformable and cooperatively associated with said handle to support said closure when connected to a container and when said handle is moved to a support position and resiliency retractable when said handle is released to automatically return it to said first position.

2. A closure according to claim 1 wherein said leg portions are torsionally and flexurally deformable.

3. A package comprising a container having connected thereto a closure according to claim 1.

References Cited

UNITED STATES PATENTS

| | | |
|---|---|---|
| 3,137,423 | 6/1964 | Tupper. |
| 3,200,986 | 8/1965 | LaGrutta. |
| 3,248,002 | 4/1966 | Song. |
| 3,311,252 | 3/1967 | Swartwood et al. |
| 3,325,044 | 6/1967 | McCutcheon ____ 220—94 XR |

RAPHAEL H. SCHWARTZ, *Primary Examiner.*

UNITED STATES PATENT OFFICE
CERTIFICATE OF CORRECTION

Patent No. 3,404,803                            October 8, 1968

Phillip N. Hilliard

It is certified that error appears in the above identified patent and that said Letters Patent are hereby corrected as shown below:

Column 3, line 16, "said" should read -- and other --; same line 16, cancel "being".

Signed and sealed this 24th day of February 1970.

(SEAL)
Attest:

Edward M. Fletcher, Jr.                      WILLIAM E. SCHUYLER, JR.
Attesting Officer                                Commissioner of Patents